United States Patent [19]
Tai et al.

[11] Patent Number: 6,093,426
[45] Date of Patent: Jul. 25, 2000

[54] BATTER, MATERIAL FOR FRYING, FREEZING AND MICROWAVE COOKING AND FROZEN FRIED MATERIAL FOR MICROWAVE COOKING

[75] Inventors: Naomichi Tai, Koshigaya; Atsushi Katayama, Urawa; Satoko Shimizu, Kodaira, all of Japan

[73] Assignee: Nichirei Corporation, Tokyo, Japan

[21] Appl. No.: 08/665,524

[22] Filed: Jun. 17, 1996

Related U.S. Application Data

[63] Continuation of application No. 08/377,136, Jan. 23, 1995, abandoned.

[30] Foreign Application Priority Data

Feb. 1, 1994 [JP] Japan ......................... 6-10531

[51] Int. Cl.$^7$ .................................................. A21D 10/04
[52] U.S. Cl. ........................... 426/94; 426/100; 426/291; 426/292; 426/302; 426/549; 426/552; 426/553
[58] Field of Search .............................. 426/89, 92, 94, 426/95, 549, 552, 553, 100, 291, 292, 302

[56] References Cited

U.S. PATENT DOCUMENTS

| | | | |
|---|---|---|---|
| 3,956,515 | 5/1976 | Moore et al. | 426/302 |
| 4,375,484 | 3/1983 | Lee et al. | 426/549 |
| 5,171,605 | 12/1992 | Attenburrow et al. | 426/656 |

*Primary Examiner*—Lien Tran
*Attorney, Agent, or Firm*—Darby & Darby

[57] ABSTRACT

A batter for application to a material for frying contains edible oils and fats, water, an edible moisture holding material having a moisture holding amount of not less than 100 g/100 g by a centrifugal method under 2000 G, a foaming agent having foaming force of not less than 50 mm when measured as a 0.1 wt % aqueous solution at 25° C. by Ross-Miles test, and an emulsion stabilizer. A material for frying contains a filling and a multi-layer formed externally of the filling, the multi-layer containing a layer of the aforementioned batter. A frozen fried material for microwave cooking is prepared by frying the material for frying and freezing the fried material.

32 Claims, No Drawings

BATTER, MATERIAL FOR FRYING, FREEZING AND MICROWAVE COOKING AND FROZEN FRIED MATERIAL FOR MICROWAVE COOKING

This is a continuation, of application Ser. No. 08/377,136, filed Jan. 23, 1995 abandoned.

BACKGROUND OF THE INVENTION

This invention relates to a material for frying, freezing and microwave cooking and a frozen fried material for microwave cooking capable of significantly reducing moisture transfer from a filling to the coating of the fried material or a material for frying during the freezing period and of holding the soft touch of the filler and the crispy touch of the fried material even after thawing and cooking by a microwave cooking device, such as an electronic range. The invention also relates to a batter utilizable for such material for frying, and freezing and the frozen fried material.

It is generally desired of the fried material to have a mixed mouth touch of the crispy touch proper to the coating and the soft touch proper to the filling. Such mouth touch is usually obtained from the food material which is served immediately after frying.

In keeping with recent progress in the freezing technology, a variety of frozen foods have been developed. As for the above-mentioned materials for frying, a variety of frozen foods have been proposed. As for these frozen materials, there are known those which can be easily cooked using a microwave cooking device, such as an electronic range. For circulation on the market, it frequently takes one to two months since the time of preparation of the frozen fried foods until they are eaten by the consumers. It has therefore been desired to develop a frozen fried material with which the above-mentioned mouth touch desired of the fried material can be obtained even after lapse of one to two months since the time of preparation.

However, it is possible with the conventional frozen fried foods to prevent transfer of the moisture in the filling to the coating of the fried material or the material for frying only for a shorter period of time, in effect, for a period of one month at most. For prolonged storage exceeding one month, the moisture in the filling is transferred to the coating of the fried material or the material for frying, such that, when the frozen food is cooked with an electronic range, the crispy mouth touch proper to the coating is lost. The frozen fried food or the frozen material for frying is generally developed on the supposition that it is stored in a frozen state at a temperature lower than $-18°$ C. However, household storage of the frozen foods by the consumer is usually at $-10°$ C. or thereabouts, while it is difficult to maintain the frozen food at a low temperature of $-18°$ C. In addition, during transport of the frozen foods, they are transiently left in a temperature environment higher than $-18°$ C. If the conventional frozen foods are left for a certain time duration in such temperature environment higher than $-18°$ C., the time during which the moisture in the filler may be prevented from being transferred to the coating of the fried food is shortened, with the result that the mouth touch of the fried food is significantly lowered. Such inconvenience has so far not been taken into account.

SUMMARY OF THE INVENTION

It is therefore an object of the present invention to provide a material for frying, freezing and microwave cooking and a frozen fried material for microwave cooking, in which moisture transfer from the filling to the coating scarcely occurs even after prolonged freezing and storage for more than one month and the soft touch proper to the filler and the crispy touch proper to the coating may be prevented from being lowered even after thawing and microwave cooking, and a batter utilizable therefor.

It is another object of the present invention to provide a material for freezing and microwave cooking and a frozen fried material for microwave cooking in which moisture transfer from the filling to the coating may be prevented even when the material is left in a high temperature environment higher than $-18°$ C. and the soft touch proper to the filling and the crispy touch proper to the coating may be prevented from being lowered even after thawing and microwave cooking.

These and other objects of the present invention will become more apparent from the following description.

According to the present invention, there is provided a batter for application to a material for frying comprising edible oils and fats, water, an edible moisture holding material having a moisture holding amount of not less than 100 g/100 g by a centrifugal method under 2000 G, a foaming agent having foaming force of not less than 50 mm when measured as a 0.1 wt % aqueous solution at $25°$ C. by Ross-Miles test, and an emulsion stabilizer.

According to the present invention, there is also provided a material for frying, freezing and microwave cooking comprising a filling and a multi-layer formed externally of the filling. The multi-layer consists essentially of (a) a first batter layer made of a material selected from the group consisting of an emulsion, an oil agent containing an edible moisture holding material, and mixtures thereof, (b) a first bread crumb layer, (c) a second batter layer formed from the batter defined as above, and (d) a second bread crumb layer. The layers (a) to (d) are formed in this order from the filling side towards an external side of the material for frying.

According to the present invention, there is also provided a frozen fried material for microwave cooking which is frozen after frying the aforementioned material.

PREFERRED EMBODIMENTS OF THE INVENTION

The present invention will be explained in more detail hereinbelow.

The batter according to the present invention is employed for the material for frying, and is operable to prevent the moisture in the filling of the material for frying from being transferred to the coating during storage in the frozen state in order to prevent the lowering of the crispy touch of the coating when cooking with a microwave cooking device. The batter is an emulsion containing, as essential components, edible oils and fats, water, an edible moisture holding material having a specified moisture holding amount, a foaming agent having specified foaming force and a specified emulsion stabilizer.

As the edible oils and fats, an edible oil which is liquid at a temperature of $60°$ C. or lower is preferred. Specifically, these edible oils and fats may be enumerated by vegetable oils and fats, such as cottonseed oil, soybean oil, peanut oil, corn oil, safflower oil, palm oil or rapeseed oil, animal oil and fats, such as lard, beef tallow, or butter, or mixtures thereof, hydrogenated products of these oils and fats, and fractionated oils and fats. The proportion of these edible oils and fats is preferably 10 to 60 wt % and more preferably 35 to 55 wt % based on the total amount of the edible oils and fats and water. The proportion of the edible oils and fats other than 10 to 60 wt % is not desirable since there may then be the risk that water transfer from the filling to the coating during storage in the frozen state cannot be prevented sufficiently.

The proportion of water is preferably 40 to 90 wt % and more preferably 45 to 65 wt % based on the total amount of the edible oils and fats and water.

The edible moisture holding material has a moisture holding amount preferably of not less than 100 g/100 g and more preferably 110 g/100 g to 400 g/100 g by a centrifugal method under 2000 G. If the moisture holding amount under the above condition is less than 100 g/100 g, moisture transfer from the filling to the coating may not be prevented satisfactorily. Since higher moisture holding amounts are desirable, there is no upper limit to the moisture holding amount.

There is no limitation to the edible moisture holding material if it has the above-mentioned moisture-holding amount. Specifically, it may be enumerated by food fibers, such as cellulose, corn fibers or crushed wheat bran, moisture holding polysaccharide, such as cyclodextrin, pregelatinized starch, heat-moisture treated starch, modified starch or alginic acid, and mixtures thereof. If the edible moisture holding material of the same type, such as food fibers, is used, desirable effects cannot be achieved unless it has the specified moisture holding amount under the above conditions. That is, the edible moisture holding material not having the specified moisture holding amount under the above conditions cannot be employed in the present invention.

The edible moisture holding material is preferably contained in an amount of 0.1 to 30 wt % and more preferably in an amount of 1 to 10 wt % based on the total weight of the batter. If the amount is outside the range of 0.1 to 30 wt %, moisture transfer from the filling to the coating curing storage when frozen may not be prevented sufficiently.

The foaming agent has foaming force of not less than 50 mm and preferably in a range from 60 to 300 mm when measured as a 0.1 wt % aqueous solution at 25° C. by Ross-Miles test. If the foaming force under such condition is less than 50 mm, the crispy touch after microwave cooking falls short. There is no upper limit to the foaming force since too high a foaming force is not deleterious to the crispy touch after microwave cooking. The Ross-Miles test is a method of measuring the height of a foam produced when dropping 200 ml of an aqueous solution of a sample at a pre-set concentration, herein a 0.1 wt % aqueous solution of the foaming agent, onto the water surface from a height of 900 mm in 30 seconds under a pre-set temperature condition, herein 25° C.

The foaming agent may be enumerated by foaming proteins, such as soybean protein, casein, egg white or gluten. If the foaming agent of the same type, such as foaming proteins is employed, desirable effects cannot be achieved unless it has the specified foaming force under the above conditions. That is, the foaming agent not having the specified foaming force under the above conditions cannot be employed in the present invention.

The foaming agent is contained preferable in an amount of 0.1 to 10 wt % and more preferably in an amount of 1 to 5 wt % based on the total weight of the batter. If the proportion of the foaming agent is less than 0.1 wt %, the crispy touch of the coating after microwave cooking tends to be lowered, whereas if it exceeds 10 wt %, the coating after microwave cooking tends to be exploded.

The emulsion stabilizer is a component for stabilizing the emulsion and preferably may be exemplified by a substance having the particle size of the emulsified particle in the emulsion of not more than 30 μm and preferably 5 to 20 μm. The particle size of the emulsified particle exceeding 30 μm may not be desirable since emulsion stability tends to be markedly lowered and the emulsion may be separated into water and oil such that moisture transfer from the filling to the coating may not be prevented sufficiently.

Specifically, the emulsion stabilizer may be enumerated by protein, such as egg white, egg yolk, casein, gelatin, skim milk, gluten or soybean protein, polysaccharides, such as pregelatinized starch, pectin, natural gums, glucomannan, carrageenan or alginic acid, surfactants, such as glycerin fatty acid esters, sorbitan fatty acid esters, sucrose fatty acid esters or lecithin, and mixtures thereof.

The emulsion stabilizer is preferably contained in an amount of 0.05 to 10 parts by weight and more preferably 1 to 10 parts by weight to 100 parts by weight of the edible oils and fats and water. If the amount of the emulsion stabilizer is less than 0.05 part by weight, it tends to be difficult to prepare a stable emulsion, whereas if it exceeds 10 parts by weight, the emulsion tends to be raised in viscosity and adaptability to the producing device tends to be lowered.

In the batter of the present invention, there are certain compounds each exhibiting two or more functions, such as the moisture holding function and the function of emulsion stabilization, as may be surmised from the fact that the same compounds are occasionally named as the edible moisture holding material and/or the foaming agent and/or the emulsion stabilizer as the above-mentioned essential components. The same compound may be employed as the essential components if the compound is added in an amount which will satisfy the above-mentioned desirable proportions. However, different compounds are desirably employed as the above-mentioned essential components for reliably improving the storage stability of the frozen fried material or the frozen material for frying employing the batter as well as the desirable mouth touch after thawing and cooking.

The batter of the present invention may be prepared by emulsifying the above-mentioned respective components as conventionally. Besides, suitable condiments, baking powders or the like may be added, if so desired. The emulsion may be of an o/w or w/o type, as desired. The batter of the present invention may be applied to the material for frying as in the case of the conventional batter. If plural batter layers are to be formed on the filling, the batter of the present invention is preferably applied at least as the outermost layer of the plural batter layers for effectively preventing moisture transfer from the filling to the coating during storage by freezing.

The material for frying according to the present invention is a material for frying, freezing and micro-wave cooking comprised a filling such as vegetables, meats, fish or shell occasionally processed and at least four layers as coatings for the material to be fried arranged on the outer side of the filling in the specified order.

With the material for frying according to the present invention, the specified layer to be formed first on the outer side of the filling is a first batter layer made of a material containing an emulsion and/or an oil agent containing an edible moisture holding material.

As the above-mentioned emulsion as the first batter layer, any usual emulsion containing the edible oils and fats, water and the emulsion stabilizer may be employed, there being no limitation as to other components. Consequently, the above-mentioned batter containing or not containing the edible moisture holding material or the foaming agent may be employed. As for the edible oils and fats and the emulsion stabilizer, those specified in connection with the above-mentioned batter may preferably be employed.

The proportions of the edible oils and fats, water and the emulsion stabilizer, as well as those of the edible moisture holding material or the foaming agent, occasionally contained in the emulsion, may preferably be the same as those specified in connection with the above-mentioned batter.

In the oil agent containing the edible moisture holding material, the compounds specified in connection with the above-mentioned batter are preferably employed as the edible moisture holding material. The proportion of the edible moisture holding material is preferably 1 to 50 wt % and more preferably 10 to 30 wt % based on the total weight of the oil agent. The amount of the edible moisture holding material less than 1 wt % is insufficient to absorb the moisture being transferred from the filling to the coating, whereas the amount of the edible moisture holding material exceeding 50 wt % is also not desirable since the oil agent is significantly lowered in fluidity and in the layer-forming capability.

The oil component of the oil agent containing the edible moisture holding material may be edible oils and fats and preferably those specified in connection with the above-mentioned batter. The amount of the oil component is preferably 50 to 99 wt % and more preferably 95 to 99 wt % based on the total weight of the oil agent. The oil content less than 90 wt % is not desirable since the operation of preventing moisture transfer from the filling to the coating tends to be lowered when the material for frying or the fried material is to be stored by freezing as the frozen material and when such frozen material is transiently left in a higher temperature environment higher than −18° C.

The first batter layer (a) may be formed by both the above-mentioned emulsion and the above-mentioned oil agent containing the edible moisture holding material. There is no particular limitation to the proportions of the emulsion and the oil agent containing the edible moisture holding material.

In the material for frying according to the present invention, the specified layer to be formed next to the first batter layer (a) is a first bread crumb layer (b) containing bread crumbs and/or bread crumb substitutes. Vegetable proteins, such as gluten (wheat) or zein (corn), animal proteins, such as gelatin or casein, powdered oils and fats containing hardened soybean oil or palm oil, or mixtures thereof, and further a variety of additives, such as condiments, coloring agents, stabilizers or mixtures thereof, may be contained for improving the crispy mouth touch proper to the coating. The bread crumbs may be enumerated by dry bread crumbs and/or fresh bread crumbs. In view of uniform affixture of the emulsion layer employed as the outer layer, it is desirable to use dry bread crumbs and/or fresh bread crumbs having a long diameter of not more than 4 mm and preferably 2 to 4 mm.

If the first bread crumb layer (b) contains the above-mentioned proteins and/or powdered oils and fats, the mixing ratio of the bread crumbs and/or bread crumb substitutes to the proteins and/or the powdered oils and fats is preferably 90:10 to 50:50 in weight ratio. On the other hand, when both the proteins and the powdered oils and fats are to be contained for improving the crispy touch of the coating after microwave cooking, the mixing ratio of the proteins to the powdered oils and fats is preferably 1:5 to 5:1 in weight ratio.

In the material for frying according to the present invention, the specified layer to be formed next to the first bread crumb layer (b) is a second batter layer (c) formed by the above-mentioned batter. If such second batter layer (c) is used in conjunction with the first batter layer (a) and if the material for frying or the fried material is stored as the frozen material as later explained, it becomes possible to prevent moisture transfer from the filling to the coating even after prolonged storage for over a month under freezing or even if the frozen material is transiently left in a high temperature environment higher than −18° C., so that the crispy touch of the coating and the soft mouth touch of the filling may be prevented from being lowered even after thawing by microwave cooling.

In the material for frying according to the present invention, the specified layer to be formed next to the second batter layer (c) is a second bread crumb layer (d) comprised of components similar in constituent components to those specified for the first bread crumb layer (b) except that the bread crumbs and/or the bread crumb substitutes of the second bread crumb layer (d) having not more than 16 mm and preferably 4 to 16 mm in long diameter and thus larger in size than those of the first bread crumb layer (b) are desirable in point of good appearance and crispiness in mouth touch. The second bread crumb layer (d) may be the same as or different from the first bread crumb layer (b) in constituent components.

With the material for frying according to the present invention, it suffices if at least the four layers (a) to (d) are formed from the filling side towards the outside of the material. Although cover layers may further be formed on the inner side of the layer (a) and/or on the outer side of the layer (d), it is desirable that the layers (a) to (d) be formed in this order from the filling surface towards the outside. There is no particular limitation to the thicknesses of the respective layers if the filling and the respective lower surfaces of the layers (a) to (c) are covered. For forming the layers (a) and (c), these layers may be formed by attaching the layers, such as by spraying, coating, flowing or immersion, as in the case of attaching the batter for preparing usual fried materials. The bread crumb layers (b) and (d) may be affixed onto the respective underlying layers in any conventional manner.

The frozen fried material according to the present invention may be obtained by frying the aforementioned material and freezing the fried material. Such frying may be carried out at an oil temperature preferably of 150 to 200° C. and more preferably 170 to 190° C. for 2 to 10 minutes and preferably for 2 to 4 minutes. Freezing may be carried out preferably at a temperature not higher than −10° C. There is no lower limit to the freezing temperature. Storage on freezing is preferably performed at a temperature not higher than −10° C. If the frozen fried material is left in a temperature environment higher than −10° C., such as during transport, the desirable effect may be maintained by freezing the material to a temperature not higher than −10° C. as soon as the upper limit of the temperature of the center portion of the frozen fried material reaches 5° C. and preferably 0° C. It is noted that the state of the upper limit of the center portion of the frozen fried material reaching 0° C. or 5° C. is equivalent to the frozen fried material being left at 40° C. for two hours and for three hours, respectively.

The frozen fried material according to the present invention may be cooked using a well-known microwave cooking utensil, such as an electronic range, preferably for 60 to 150 seconds, before being served.

Since the batter of the present invention is an emulsion containing a specified edible moisture holding material, a specified foaming agent and a specified emulsion stabilizer, it is effective with such batter employed for the material for frying or the frozen fried material to prevent moisture transfer from the filling towards the coating during storage in a frozen state.

Since the specified four layers (a) to (d) including the outermost specific batter layer (c) are formed on the outer side of the filling in a specified order, there is scarcely any risk of moisture transfer from the filling towards the coating even during storage under freezing over a prolonged time period exceeding one month or even if the storage temperature transiently exceeds −18° C. during the storage period, it becomes possible to prevent the crispy touch proper to the coating or the soft touch of the filling from being lowered after thawing and microwave cooking.

EXAMPLES OF THE INVENTION

The present invention will be explained with reference to Examples and Comparative Examples which are given only for the sake of illustration and are not intended for limiting the invention.

Example 1

1 part by weight of soybean protein having the emulsified particles 10 μm in diameter was added to a mixed liquid composed of 50 parts by weight of water, 50 parts by weight of soybean oil and 1 part by weight of food fibers having the water holding amount as measured by a centrifugal method under 2000 G, referred to herein simply as the moisture holding amount, equal to 200 g/100 g, to prepare an o/w type emulsion. Then, as a foaming agent, 1 part by weight of the egg white having the foaming force as measured as a 0.1 wt % aqueous solution at 25° C. by Ross-Miles test, referred to herein simply as the foaming force, of 200 mm, was added to the emulsion to prepare a batter for the frozen fried material, referred to herein as a batter (1).

Each crude vegetable croquette previously prepared in a known manner from potato and ground pork meat, was immersed for several seconds in the batter (1) to form a layer of the batter (1) on the surface of each crude croquette. Then, fresh bread crumbs having the long diameter of 16 mm were affixed on each batter layer to form a bread crumb layer to prepare a material for the vegetable croquette. The resulting materials were fried with a salad oil at 180° C. and frozen at −18° C. immediately for preparing frozen croquettes. A number of such frozen croquettes stored in a frozen state at −18° C. for three days, were heated for 100 seconds by an electronic range and served to ten panellers by way of conducting a mouth feel touch test. The results of such functional tests are shown in Table 1.

As for these results, mean marks given by the panellers were found in accordance with the following evaluation standards to give evaluation marks.

Mark 0: no crispy touch.

Mark 3: although the crispy touch becomes inferior as compared to that immediately after frying, the fried material is acceptable as an article of commerce.

Mark 5: the crispy touch is substantially equivalent to that immediately after frying.

Examples 2 to 4

Each batter was prepared in the same way as for Example 1, except using the starting materials shown in Table 1 in proportions shown in Table 1, and subsequently each frozen croquette was prepared. The produced frozen croquettes were evaluated in the same way as in Example 1. The results are also shown in Table 1.

It is seen from the results of Table 1 that, with the frozen fried materials employing the batters of the respective Examples, the crispy touch comparable to that immediately after frying is obtained after storage under freezing, such that the moisture had been effectively prevented from being transferred from the filling to the coating due to storage under freezing.

TABLE 1

| | Water to soybean oil ratio | Moisture holding material | Moisture holding amount | Amount added (%) | Foaming agent | Foaming force | Amount added (%) | Emulsion stabilizer | (Emulsified particle size) | Amount added (%) | Marks after three days since freezing |
|---|---|---|---|---|---|---|---|---|---|---|---|
| Ex. 1 | 50:50 | Food fibers | 200 | 1 | Egg white | 200 | 1 | Soybean protein | (10 μm) | 1 | 4.6 |
| 2 | 50:50 | Modified starch | 150 | 5 | Egg white | 200 | 1 | Soybean protein | (10 μm) | 1 | 4.5 |
| 3 | 50:50 | Food fibers | 200 | 1 | Gulten | 60 | 1 | Soybean protein | (10 μm) | 1 | 4.2 |
| 4 | 50:50 | Food fibers | 200 | 1 | Egg white | 200 | 1 | Pregelatinized starch | (20 μm) | 10 | 4.4 |

Example 5

1 part by weight of soybean protein having the emulsified particles 10 μm in diameter was added to a mixed liquid composed of 50 parts by weight of water, 50 parts by weight of soybean oil and 1 part by weight of food fibers having the water holding amount equal to 200 g/100 g, to prepare an o/w type emulsion, referred to herein as an emulsion (A). Then, crude vegetable croquettes previously prepared in a known manner from potato and ground pork meat, were immersed for several seconds in the emulsion (A) to form a layer of the emulsion (A) on the surface of each crude croquette. On the surface of the emulsion (A) were then affixed dry bread crumbs having a long diameter of 4 mm to form a first bread crumb layer. The batter (1) prepared in accordance with Example 1 was then coated thereon to form a layer of the batter (1) on the surface of the first bread crumb layer. On the batter layer were then affixed fresh bread crumbs having the long diameter of 16 mm for forming a second bread crumb layer to prepare materials for vegetable croquettes.

The resulting materials (vegetable croquettes) were fried with salad oil at 180° C. and immediately frozen to −18° C. to prepare frozen vegetable croquettes. The frozen croquettes stored in the frozen state at −18° C. for one month and the frozen croquettes stored in the frozen state at the same temperature for three months were cooked for 100 seconds by an electronic range. The cooked croquettes were served to ten panellers by way of conducting a mouth touch feel test in the same way as in Example 1. The averaged marks given by the panellers are shown in Table 2.

Example 6

Frozen croquettes were prepared in the same way as in Example 5, except using the batter (1) prepared in Example 1 in place of the emulsion (A). The frozen croquettes were then cooked and subjected to a mouth touch feel test. The results are shown in Table 2.

Example 7

Frozen croquettes were prepared in the same way as in Example 5, except using bread crumbs composed of dry bread crumbs 4 mm in diameter, 12.5 wt % of powdered oils and fats, 12.5 wt % of gluten based on the total weight of the dry bread crumbs, as the first bread crumb layer. The frozen croquettes were then cooked and subjected to a mouth touch feel test. The results are shown in Table 2.

Example 8

Frozen croquettes were prepared in the same way as in Example 5, except using an oil agent composed of 100 parts by weight of soybean oil and 10 parts by weight of food fibers having the moisture holding amount of 200 g/100 g in place of the emulsion (A). The frozen croquettes were then cooked and subjected to a mouth touch feel test. The results are shown in Table 2.

Example 9

Frozen croquettes were prepared in the same way as in Example 5, except using an oil agent composed of 100 parts by weight of soybean oil and 10 parts by weight of food fibers having the moisture holding amount of 200 g/100 g in place of the emulsion (A) and also except using bread crumbs composed of dry bread crumbs 4 mm in diameter, 12.5 wt % of powdered oils and fats, 12.5 wt % of gluten based on the total weight of the dry bread crumbs, as the first bread crumb layer. The frozen croquettes were then cooked and subjected to a mouth touch feel test. The results are shown in Table 2.

Comparative Example 1

Frozen croquettes were prepared in the same way as in Example 5, except using, in place of the batter (1), a batter of an emulsion prepared by adding 10 parts by weight of soybean protein having the emulsified particle diameter of 10 μm to a mixed liquid composed of 50 parts by weight of water, 50 parts by weight of soybean oil and 1 part by weight of rice starch having the moisture holding amount of 90 g/100 g to give an o/w type emulsion and by subsequently adding 1 part by weight of soft flour having the foaming force of 30 mm as the foaming agent. The frozen croquettes were then cooked and subjected to a mouth touch feel test. The results are shown in Table 2.

Comparative Example 2

Frozen croquettes were prepared in the same way as in Example 5, except using a batter composed of 93 parts by weight of water and 7 parts by weight of rice starch in place of the emulsion (A). The frozen croquettes were then cooked and subjected to a mouth touch feel test. The results are shown in Table 2.

Comparative Example 3

Frozen croquettes were prepared in the same way as in Example 5, except using a batter composed of 7 parts by weight of rice powders, 16 parts by weight of wheat powders, 2parts by weight of sugar, 1 part by weight of table salt and 74 parts by weight of water in place of the batter (1). The frozen croquettes were then cooked and subjected to a mouth touch feel test. The results are shown in Table 2.

Comparative Example 4

Frozen croquettes were prepared in the same way as in Example 5, except using a batter composed of 93 parts by weight of water and 7 parts by weight of rice starch in place of the emulsion (A) and also except using a batter composed of 7 parts by weight of rice powders, 16 parts by weight of wheat powders, 2 parts by weight of sugar, 1 part by weight of table salt and 74 parts by weight of water in place of the batter (1). The frozen croquettes were then cooked and subjected to a mouth touch feel test. The results are shown in Table 2.

Comparative Example 5

Frozen croquettes were prepared in the same way as in Example 5, except using a batter composed of 88 parts by weight of waxy corn starch, 5 parts by weight of high-grade rice powders, 5 parts by weight of wheat powders, 2 parts by weight of protein hydrolyzate and 100 parts by weight of water in place of the emulsion (A), except using an emulsion composed of 80 parts by weight of corn oil, 15 parts by weight of water and 5 parts by weight of soybean protein as an emulsion stabilizer, in place of the batter (1), except forming an emulsion layer by an emulsion composed of 30 parts by weight of corn oil, 60 parts by weight of water and 10 parts by weight of soybean protein, on the second bread crumb layer, and except forming a third bread crumb layer similar to the second bread crumb layer on the emulsion layer. The frozen croquettes were then cooked and subjected to a mouth touch feel test. The results are shown in Table 2.

Comparative Example 6

Frozen croquettes were prepared in the same way as in Example 5, except not forming the batter (1) nor the second bread crumb layer. The frozen croquettes were then cooked and subjected to a mouth touch feel test. The results are shown in Table 2.

TABLE 2

| | | Immediately after freezing | Marks After one month | After three months |
|---|---|---|---|---|
| Ex. | 5 | 4.8 | 4.3 | 3.5 |
| | 6 | 4.7 | 4.3 | 3.3 |
| | 7 | 5.0 | 4.0 | 3.6 |
| | 8 | 4.9 | 4.5 | 3.8 |
| | 9 | 4.9 | 4.6 | 3.9 |
| Comp. Ex. | 1 | 3.8 | 1.0 | 0.5 |
| | 2 | 4.0 | 2.9 | 1.8 |
| | 3 | 2.5 | 0.7 | 0.3 |
| | 4 | 1.5 | 0.3 | 0.1 |
| | 5 | 4.3 | 2.6 | 1.5 |
| | 6 | 1.0 | 0.2 | 0.1 |

Example 10

The frozen croquettes prepared in Examples 5 and 8, were raised in temperature after freezing for 24 hours until the center portions thereof reached the temperature of 5° C., and were immediately re-frozen to −18° C. The croquettes immediately after re-frozen, after one month since freezing and after three months since re-freezing, were then cooked and subjected to a mouth touch feel test. The results are shown in Table 3.

TABLE 3

|  | Immediately after re-frozen | One month after re-frozen | Three months after re-frozen |
|---|---|---|---|
| Croquette of Ex. 5 | 3.6 | 3.0 | 2.5 |
| Croquette of Ex. 8 | 4.4 | 3.6 | 3.0 |
| Croquette of Comp. Ex. 6 | 2.8 | 1.0 | 0.2 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An emulsion batter for coating a filling and to prepare a breaded product to be stored in a frozen state, said emulsion batter comprising:
   (1) an edible fat,
   (2) water,
   (3) an edible moisture holding material selected to have a moisture holding amount of not less than 100 g per 100 g of said edible moisture holding material as measured by a centrifugal method under 2000 G,
   (4) a foaming agent selected to have a foaming force of not less than 50 mm when measured as a 0.1 wt % aqueous solution at 25° by the Ross-Miles test, and
   (5) an emulsion stabilizer.

2. The emulsion batter as in claim 1 wherein said edible fat is selected from the group consisting of cottonseed oil, soybean oil, peanut oil, corn oil, safflower oil, palm oil, rapeseed oil, lard, beef tallow, butter, hydrogenated products and fractionated products of these oils and fats, and mixtures thereof.

3. The emulsion batter as in claim 1 wherein said edible fat is contained in an amount of 10 to 60 wt % and said water is contained in an amount of 40 to 90 wt % based on total weight of said edible fat and water.

4. The emulsion batter as claimed in claim 1 wherein said edible moisture holding material is selected from the group consisting of food fibers, moisture holding polysaccharide and mixtures thereof, each having a moisture holding amount of not less than 100 g per 100 g of said edible moisture holding material as measured by a centrifugal method under 2000 G.

5. The emulsion batter as claimed in claim 4 wherein said food fibers are selected from the group consisting of cellulose, corn fibers, crushed wheat bran and mixtures thereof, each having a moisture holding amount of not less than 100 g per 100 g of said edible moisture holding material as measured by a centrifugal method under 2000 G.

6. The emulsion batter as in claim 4 wherein said moisture holding polysaccharide is selected from the group consisting of cyclodextrin, pregelatinized starch, heat-moisture treated starch, modified starch, alginic acid, and mixtures thereof.

7. The emulsion batter as in claim 1 wherein said moisture holding material is contained in an amount of 0.1 to 30 wt % based on total weight of the emulsion batter.

8. The emulsion batter as claimed in claim 1 wherein said foaming agent is selected from the group consisting of soybean protein, casein, egg white, gluten and mixtures thereof, each having a foaming force of not less than 50 mm when measured as a 0.1 wt % aqueous solution at 25° C. by the Ross-Miles test.

9. The emulsion batter as in claim 1 wherein said foaming agent is contained in an amount of 0.1 to 10 wt % based on total weight of the emulsion batter.

10. The emulsion batter as in claim 1 wherein said emulsion stabilizer is selected from the group consisting of egg white, egg yolk, casein, gelatin, skim milk, gluten, soybean protein, pregelatinized starch, pectin, natural gums, gluco-mannan, carrageenan, alginic acid, glycerin fatty acid esters, sorbitan fatty acid esters, sucrose fatty acid esters, lecithin, and mixtures thereof.

11. The emulsion batter as in claim 1 wherein said emulsion stabilizer is contained in an amount of 0.05 to 10 parts by weight to 100 parts by weight of the edible fat and of water.

12. A breaded product formed of a filling and a multi-layer coating surrounding the filling that is adapted to be stored in a frozen state after being fried and to be eaten after microwave cooking, said multi-layer coating being formed externally of said filling, said multi-layer coating formed of layers
   (a) a first batter layer made of a material selected from the group consisting of an emulsion batter, an oil batter containing an edible fat and an edible moisture holding material free of water, and mixtures thereof,
   (b) a first bread crumb layer on said first batter layer,
   (c) a second batter layer on said first bread crumb layer, said second batter layer being made of an emulsion batter comprising:
      (1) an edible fat,
      (2) water,
      (3) an edible moisture holding material selected to have a moisture holding amount of not less than 100 g per 100 g of said edible moisture holding material as measured by a centrifugal method under 2000 G,
      (4) a foaming agent selected to have a foaming force of not less than 50 mm when measured as a 0.1 wt % aqueous solution at 25° C. by the Ross-Miles test, and
      (5) an emulsion stabilizer, and
   (d) a second bread crumb layer on said second batter layer.

13. The breaded product as in claim 12 wherein an emulsion batter constituting the first batter layer (a) contains water, an edible fat and an emulsion stabilizer.

14. The breaded product as in claim 12 wherein the first batter layer (a) is made of an emulsion batter comprising:
   (1) an edible fat,
   (2) water,
   (3) an edible moisture holding material selected to have a moisture holding amount of not less than 10 g per 10 g of said edible moisture holding material as measured by a centrifugal method under 2000 G,
   (4) a foaming agent selected to have a foaming force of not less than 50 mm when measured as a 0.1 wt % aqueous solution at 25° C. by the Ross-Miles test, and
   (5) an emulsion stabilizer.

15. The breaded product as in claim 12 wherein the edible moisture holding material in said oil batter for the first batter layer (a) is selected from the group consisting of cellulose, corn fibers, crushed wheat bran, cyclodextrin, pregelatinized starch, heat-moisture treated starch, modified starch, alginic acid, and mixtures thereof.

16. The breaded product as in claim 12 wherein the edible moisture holding material in said oil batter for the first batter layer (a) is contained in an amount of 1 to 50 wt % based on total weight of said oil batter.

17. The breaded product as in claim 12 wherein the edible fat in said oil batter for the first batter layer (a) is selected from the group consisting of cottonseed oil, soybean oil, corn oil, safflower oil, palm oil, rapeseed oil, lard, beef tallow, butter, hydrogenated products and fractionated products of these oils and fats, and mixtures thereof.

18. The breaded product as in claim 12 wherein the edible fat in said oil batter for the first batter layer (a) is contained in an amount of 50 to 99 wt % based on total weight of the oil batter.

19. The breaded product as in claim 12 wherein the first bread crumb layer (b) contains bread crumbs selected from the group consisting of dry bread crumbs, fresh bread crumbs and mixtures thereof.

20. The breaded product as in claim 19 wherein the bread crumbs are of a long diameter of not more than 4 mm.

21. The breaded product as in claim 19 wherein the first bread crumb layer (b) further contains a mixture of proteins, powdered oils and fats in addition to the bread crumbs.

22. The breaded product as in claim 21 wherein the ratio by weight of the bread crumbs to said mixture is in the range of 90:10 to 50:50.

23. The breaded product as in claim 21 wherein the ratio by weight of the proteins to the powdered fat is in the range of 1:5 to 5:1.

24. The breaded product as in claim 12 wherein the second bread crumb layer (d) contains bread crumb selected from the group consisting of dry bread crumbs, fresh bread crumbs and mixtures thereof.

25. The breaded product as in claim 24 wherein the bread crumbs are of a long diameter of not more than 16 mm.

26. The breaded product as in claim 24 wherein the second bread crumb layer (d) further contains a mixture of a protein, and a powdered fat in addition to the bread crumbs.

27. The breaded product as in claim 26 wherein a ratio by weight of the bread crumbs to said mixture is in the range of 90:10 to 50:50.

28. The breaded product as in claim 26 wherein a ratio by weight of the protein to the powdered fat is in the range of 1:5 to 5:1.

29. A frozen fried product for microwave cooking prepared by frying the product defined in claim 12 to produce a fried material and freezing said fried material.

30. The frozen fried product of claim 29 prepared by frying the material at a temperature of 150 to 200° C. for 2 to 10 minutes.

31. The frozen fried product as claimed in claim 29 prepared by freezing the fried material at a temperature not higher than −10° C.

32. The emulsion batter as in claim 1 wherein said breaded product to be prepared is fried before being stored in a frozen state.

* * * * *